United States Patent [19]

Carlier et al.

[11] Patent Number: 5,264,322

[45] Date of Patent: Nov. 23, 1993

[54] SULFONATED XANTHENE DYES, AND PHOTOGRAPHIC PRODUCTS AND PROCESSES EMPLOYING THESE DYES

[75] Inventors: Paul R. Carlier, Newton; Michael P. Filosa, Medfield; Mary P. Lockshin, Cambridge, all of Mass.

[73] Assignee: Polaroid Corporation, Cambridge, Mass.

[21] Appl. No.: 874,858

[22] Filed: Apr. 28, 1992

Related U.S. Application Data

[62] Division of Ser. No. 683,452, Apr. 8, 1991.

[51] Int. Cl.$^5$ .......................... G03C 5/54; G03C 1/84
[52] U.S. Cl. .................... 430/221; 430/236; 430/446; 430/517; 430/520
[58] Field of Search ............... 430/221, 520, 517, 446, 430/236

[56] References Cited

U.S. PATENT DOCUMENTS

| | | | |
|---|---|---|---|
| 1,879,537 | 9/1932 | Schneider . | |
| 1,994,876 | 3/1935 | Schneider et al. | 430/520 |
| 2,182,794 | 12/1939 | Dawson | 430/517 |
| 2,203,767 | 6/1940 | Baldsiefen | 430/517 |
| 2,203,768 | 6/1940 | Baldsiefen | 430/517 |
| 2,350,090 | 5/1944 | Beilenson | 430/513 |
| 2,774,668 | 12/1956 | Rogers | 96/29 |
| 2,968,554 | 1/1961 | Land | 96/3 |
| 2,983,606 | 5/1961 | Rogers | 96/29 |
| 3,005,711 | 10/1961 | Burgardt et al. | 96/84 |
| 3,087,817 | 4/1963 | Rogers | 96/29 |
| 3,148,061 | 9/1964 | Haas | 96/29 |
| 3,185,567 | 5/1965 | Rogers | 96/3 |
| 3,227,550 | 1/1966 | Whitmore et al. | 96/3 |
| 3,227,552 | 1/1966 | Whitmore | 96/3 |
| 3,230,082 | 1/1966 | Land et al. | 96/3 |
| 3,345,163 | 10/1967 | Land et al. | 96/3 |
| 3,406,069 | 10/1968 | De Witt Overman | 96/74 |
| 3,415,644 | 12/1968 | Land | 96/3 |
| 3,415,645 | 12/1968 | Land | 96/3 |
| 3,415,646 | 12/1968 | Land | 96/3 |
| 3,443,939 | 5/1969 | Bloom et al. | 96/3 |
| 3,443,940 | 5/1969 | Bloom et al. | 96/3 |
| 3,443,943 | 5/1969 | Rogers et al. | 96/29 |
| 3,447,437 | 6/1969 | Tiffany | 95/13 |
| 3,594,164 | 7/1971 | Rogers | 96/3 |

(List continued on next page.)

FOREIGN PATENT DOCUMENTS 1482156 8/1987 United Kingdom .

Primary Examiner—Richard L. Schilling
Attorney, Agent, or Firm—David J. Cole

[57] ABSTRACT

Xanthene derivatives having cations of the formula:

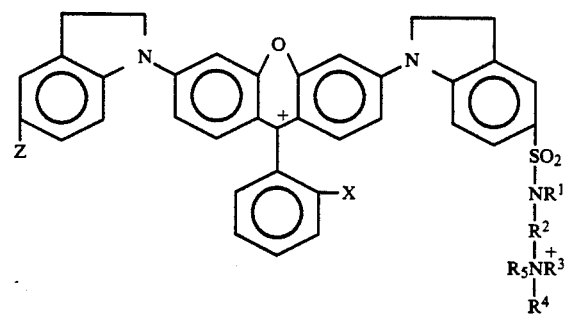

in which X is an —SO$_2$—N(R$^6$)—COR$^7$ or —SO$_2$—N(-R$^6$—CO$_2$(CH$_2$)$_2$Y grouping, wherein R$^6$ is an alkyl group containing not more than about 6 carbon atoms, R$^7$ is an alkyl or aryl group containing not more than about 10 carbon atoms and Y is an electron-withdrawing group; Z is a hydrogen atom or an —SO$_2$—N(R$^1$)—R$^2$—NR$^3$R$^4$R$^5$ grouping; R$^1$ is hydrogen or an alkyl group containing not more than about 6 carbon atoms; R$^2$ is an alkylene group containing from 2 to about 10 carbon atoms; R$^3$ and R$^4$ are each independently an alkyl group containing not more than about 6 carbon atoms, and R$^5$ is a hydrogen atom or an alkyl group containing not more than about 6 carbon atoms, are useful as light-screening dyes in photographic products and processes.

26 Claims, 3 Drawing Sheets

U.S. PATENT DOCUMENTS

| | | | |
|---|---|---|---|
| 3,594,165 | 7/1971 | Rogers | 96/3 |
| 3,615,548 | 10/1971 | Firestine | 430/520 |
| 3,647,437 | 3/1972 | Land | 430/221 |
| 3,652,281 | 3/1972 | Bachelder et al. | |
| 3,652,282 | 3/1972 | Land | 96/76 |
| 3,719,489 | 3/1973 | Cieciuch et al. | 96/29 D |
| 3,756,814 | 9/1973 | Bedell | 96/3 |
| 3,793,023 | 2/1974 | Land | 96/3 |
| 4,076,529 | 2/1978 | Fleckenstein et al. | 96/3 |
| 4,098,783 | 7/1978 | Cieciuch et al. | 260/147 |
| 4,258,118 | 3/1981 | Foley et al. | 430/221 |
| 4,258,119 | 3/1981 | Cournoyer et al. | 430/221 |
| 4,290,950 | 9/1981 | Cournoyer et al. | 260/326.12 R |
| 4,322,489 | 3/1982 | Land et al. | 430/213 |
| 4,424,326 | 1/1984 | Land et al. | 526/265 |
| 4,740,448 | 4/1988 | Kliem | 430/214 |
| 4,794,067 | 12/1988 | Grasshoff et al. | 430/213 |

SULFONATED XANTHENE DYES, AND PHOTOGRAPHIC PRODUCTS AND PROCESSES EMPLOYING THESE DYES

This application is a divisional of application Ser. No. 07/683,452 filed Apr. 8, 1991, now allowed.

BACKGROUND OF THE INVENTION

This invention relates to sulfonated xanthene dyes, and to photographic products and processes using these dyes.

It is well known that photographic film, especially multicolor film, may and generally does vary from lot to lot, notwithstanding efforts to "repeat" previous films. Manufacturers of multicolor photographic film have developed a number of procedures to minimize the effects upon the final multicolor image of unavoidable variations in manufacturing operations. These variations are reflected primarily in shifts in color balance as reflected in mismatching of the D log E curves of the individual red, green and blue exposures. Equipment used to coat multicolor film is highly precise but variations from the intended coverage of silver halide and/or the dye image-forming materials do occur. Repeat batches of silver halide emulsions may, and usually do, vary in their photographic response. Individual layers may be dried to slightly different degrees. Film is stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within $\pm 0.5°$ C. from a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic sources of sensitometric variations noted above exist also in multicolor diffusion transfer films, with the added complication that once the film is shipped, the sensitometric properties are essentially fixed. The opportunity for adjustment provided in darkroom processing, practically speaking, is not available for users of self-developing films. While professional and advanced amateur photographers may be skillful enough to utilize color correction filters to at least partially "rebalance" the color balance, ordinary users of the film would only be confused by such additional operations.

It is well known to use a light-screening dye in a photographic product. Such a dye may be incorporated as a filter dye in a light-sensitive emulsion layer, in a layer coated over one or more light-sensitive emulsion layers, or between two differently color-sensitized emulsion layers, to modify the light record in the emulsion layer or to control the spectral composition of light falling on an underlying light-sensitive layer, or it may be incorporated as an antihalation dye in a non-light-sensitive layer positioned on either side of a support carrying the light-sensitive layer(s).

The dye employed for these purposes, in addition to having the requisite spectral absorption characteristics for its intended use, should be photochemically inert, that is, it should not have any adverse effect on the properties of the light-sensitive emulsion layer(s), and it should be capable of being decolorized or removed during photographic processing so as not to leave stain in the processed photographic product. Even in photographic processes where the dye is removed by being dissolved in a processing solution, it is also usually preferred that the dye decolorize in order to avoid contamination of the processing solution and to prevent staining from residual dye in the processed photographic product.

Although various classes of dyes have been proposed for use in antihalation and color correction filter layers, many of the dyes heretofore employed have not been altogether satisfactory. Some of the dyes tend to reduce sensitivity, fog or exert other adverse effect on the photographic product. However, the major drawback of many dyes previously employed is their tendency to cause stain due to incomplete decolorization or reversal of some of the decolorized form to the original colored form. For example, some classes of dyes rely on the presence of a reagent, such as a sulfite, for "bleaching", i.e., decolorization, and unless the dye is removed from the photographic product during or after processing, its color may reappear in time as the decolorized dye is slowly re-oxidized.

Among the classes of light-screening dyes used previously are the triarylmethanes and xanthenes. For example, U.S. Pat. Nos. 1,879,537; 1,994,876; 2,350,090 and 3,005,711 disclose the use of fuchsone-type dyes in antihalation layers, and U.S. Pat. Nos. 3,406,069 and 3,615,548 are concerned with the metal chelates of fuchsone dyes as antihalation dyes. These and other types of triarylmethane dyes suffer from one or more of the drawbacks discussed above, and in particular, prior dyes of this type have been difficult to keep decolorized at the pH's normally encountered during processing subsequent to "bleaching" and in the final product. Xanthenes have been employed in antihalation layers that are removed during photographic processing. For example, U.S. Pat. Nos. 2,182,794; 2,203,767 and 2,203,768 disclose the use of rhodamine dyes in certain antihalation layers that are removed during processing in an acid bath or a plain water rinse bath depending upon the solubility characteristics of the particular layer.

U.S. Pat. No. 4,258,118, issued Mar. 24, 1981 to James W. Foley, Louis Locatell, Jr. and Charles M. Zepp, and assigned to the same assignee as the present application, describes certain 3,6-bis-indolinoxanthene derivatives, which find utility as photographic light-screening dyes and offer advantages over the light-screening dyes previously used because of their ability to decolorize completely and irreversibly to a substantially inert colorless product. Specifically, the dyes disclosed and claimed in this patent comprise xanthene derivatives having cations of the formula:

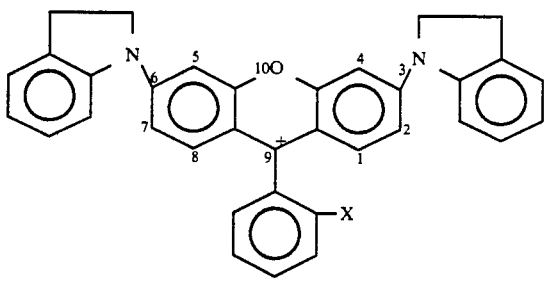

in which X is an —SO$_2$—N(R')—COCH$_3$ or —SO$_2$—N(R')—CO$_2$(CH$_2$)$_2$Y grouping, wherein R' is an alkyl group and Y is an electron-withdrawing group.

These dyes suffer, however, from the disadvantage their wavelength of maximum absorption ($\lambda_{max}$) undergoes substantial shifts in the presence of certain wetting agents and polymeric binders; in extreme cases, the absorption may even be shifted into the near infra-red, thereby rendering the dyes unsuitable for use in conventional photographic products sensitive to visible light. In addition, these dyes are difficult to disperse in certain media.

U.S. Pat. No. 4,258,119, and U.S. Pat. No. 4,290,950, both to Cournoyer et al. and assigned to the same assignee as the present application, describe sulfonated derivatives of the dyes described in the aforementioned U.S. Pat. No. 4,258,118; the disclosures of these patents are herein incorporated by reference. These sulfonated dyes, which are stated in Pat. Nos. 4,258,119 and 4,290,950, to be of the formula:

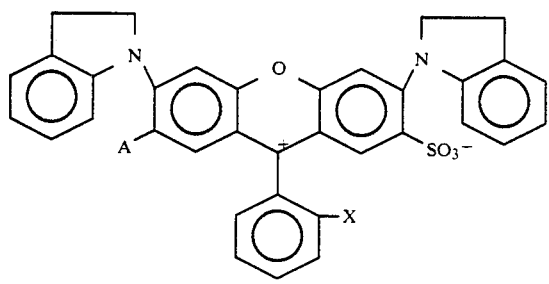

in which X is as defined above and A is a hydrogen atom or an —SO$_3$H group, have recently been found to be of the formula:

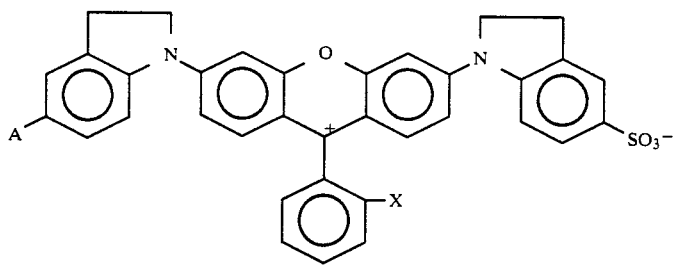

in which X and A are as defined above. These sulfonated dyes do not undergo the shifts in $\lambda_{max}$ in polymeric media which the unsulfonated dyes do. However, these sulfonated derivatives do undergo very slow conversion to the uncolored form of the dye during storage of photographic products containing these dyes, and this slow conversion may limit the shelf-life of such photographic products. Furthermore, when these sulfonated dyes are used in self-developing photographic products, in practice it is typically necessary to coat the dyes from a mixture of water and trifluoroethanol to prevent agglomeration of the dyes upon contact with the mordant. Trifluoroethanol is highly acutely toxic, a severe irritant, can cause tissue damage and pulmonary edema, and is also known to have undesirable effects on the male reproductive system. Accordingly, it is highly desirable to eliminate this solvent from manufacturing operations.

Accordingly, there is a need for dyes having similar properties to those disclosed in the aforementioned U.S. Pat. Nos. 4,258,119 and 4,290,950, but which have greater storage stability and which can be coated without the use of toxic solvents. The present invention provides dyes meeting these requirements.

SUMMARY OF THE INVENTION

This invention provides a xanthene derivative having a cation of the formula:

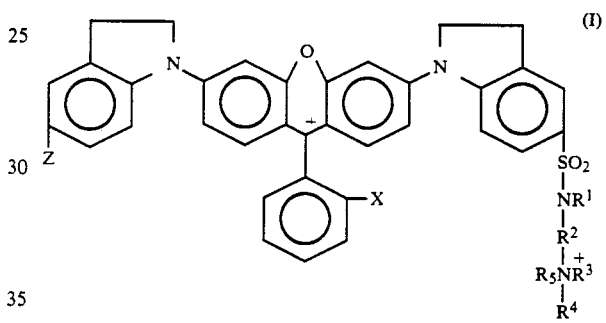

in which X is an —SO$_2$—(R$^6$)—COR$^7$ or —SO$_2$—(R$^6$)—CO$_2$(CH$_2$)$_2$Y grouping, wherein R$^6$ is an alkyl group containing not more than about 6 carbon atoms, R$^7$ is an alkyl or aryl group containing not more than about 10 carbon atoms and Y is an electron-withdrawing group; Z is a hydrogen atom or an —SO$_2$—N(R$^1$)—R$^2$—NR$^3$R$^4$R$^5$ grouping; R$^1$ is hydrogen or an alkyl group containing not more than about 6 carbon atoms; R$^2$ is an alkylene group containing from 2 to about 10 carbon atoms; R$^3$ and R$^4$ are each independently an alkyl group containing not more than about 6 carbon atoms, and R$^5$ is a hydrogen atom or an alkyl group containing not more than about 6 carbon atoms.

This invention also provides a process for the preparation of such a xanthene derivative, which process comprises:

a. treating the corresponding 2-[3,6-bis(5-sulfoindolino)xanthen-9-yl]benzenesulfonamide or 2-[3-(5- sulfoindolino)-6-indolinoxanthen-9-yl]-benzenesulfonamide with a halogenating agent (a term which is used herein to mean fluorinating, chlorinating or brominating agent) to produce the corresponding sulfonyl halide;

b. condensing the sulfonyl halide thus produced with a diamine have one tertiary amino group and one primary or secondary amino group to produce the corresponding N-(dialkylaminoalkyl)sulfonamide;

c. treating the N-(dialkylaminoalkyl)sulfonamide thus produced with an alkylating agent to produce the corresponding N((trialkylammoniumalkyl)sulfonamide; and d. oxidizing the N-(trialkylammoniumalkyl)sulfonamide thus produced to remove the hydrogen atom from the 9-position of the xanthenyl group to produce the xanthene derivative. Alternatively, steps b. and c. of this process may be replaced by condensing the sulfonyl halide produced in step a. with a diamine having a quaternary amino group and one primary or secondary amino group to produce the corresponding quaternary alkylammoniumalkylsulfonamide product comprising a plurality of layers including a support and at least one photosensitive silver halide emulsion layer carried on the support, at least one of the plurality of layers comprising a colored xanthene derivative of this invention.

This invention also provides a photographic process which comprises:

exposing a photographic product comprising a plurality of layers including a support and at least one photosensitive silver halide emulsion layer carried on the support, at least one of the plurality of layers comprising a colored xanthene derivative of this invention: and contacting the exposed photosensitive silver halide emulsion layer(s) with an aqueous processing composition having an alkaline pH, and thereby effecting development of the exposed photosensitive silver halide emulsion layer(s).

Finally, this invention provides a xanthene derivative of the formula, or having a cation of the formula:

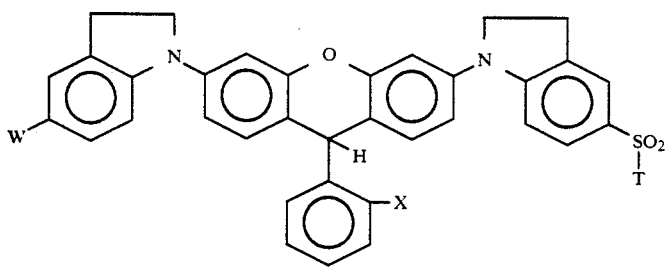

(II)

in which X is an $-SO_2-(R^6)-COR^7$ or $-SO_2-(R^6)-CO_2(CH_2)_2Y$ grouping, wherein $R^6$ is an alkyl group containing not more than about 6 carbon atoms, $R^7$ is an alkyl or aryl group containing not more than about 10 carbon atoms and Y is an electron-withdrawing group; W is a hydrogen atom or an $-SO_2T$ group; each T is a fluorine, chlorine or bromine atom, or an $-N(R^1)-R^2-NR^3R^4$ or $-N(R^1)-R^2-NR^3R^4R^5$ group, wherein $R^1$ is hydrogen or an alkyl group containing not more than about 6 carbon atoms; $R^2$ is an alkylene group containing from 2 to about 10 carbon atoms; $R^3$ and $R^4$ are each independently an alkyl group containing not more than about 6 carbon atoms, and $R^5$ is a hydrogen atom or an alkyl group containing not more than about 6 carbon atoms. These xanthene derivatives of Formula II are useful as intermediates in the synthesis of the derivatives of Formula I.

DETAILED DESCRIPTION OF THE INVENTION

Figure 1:
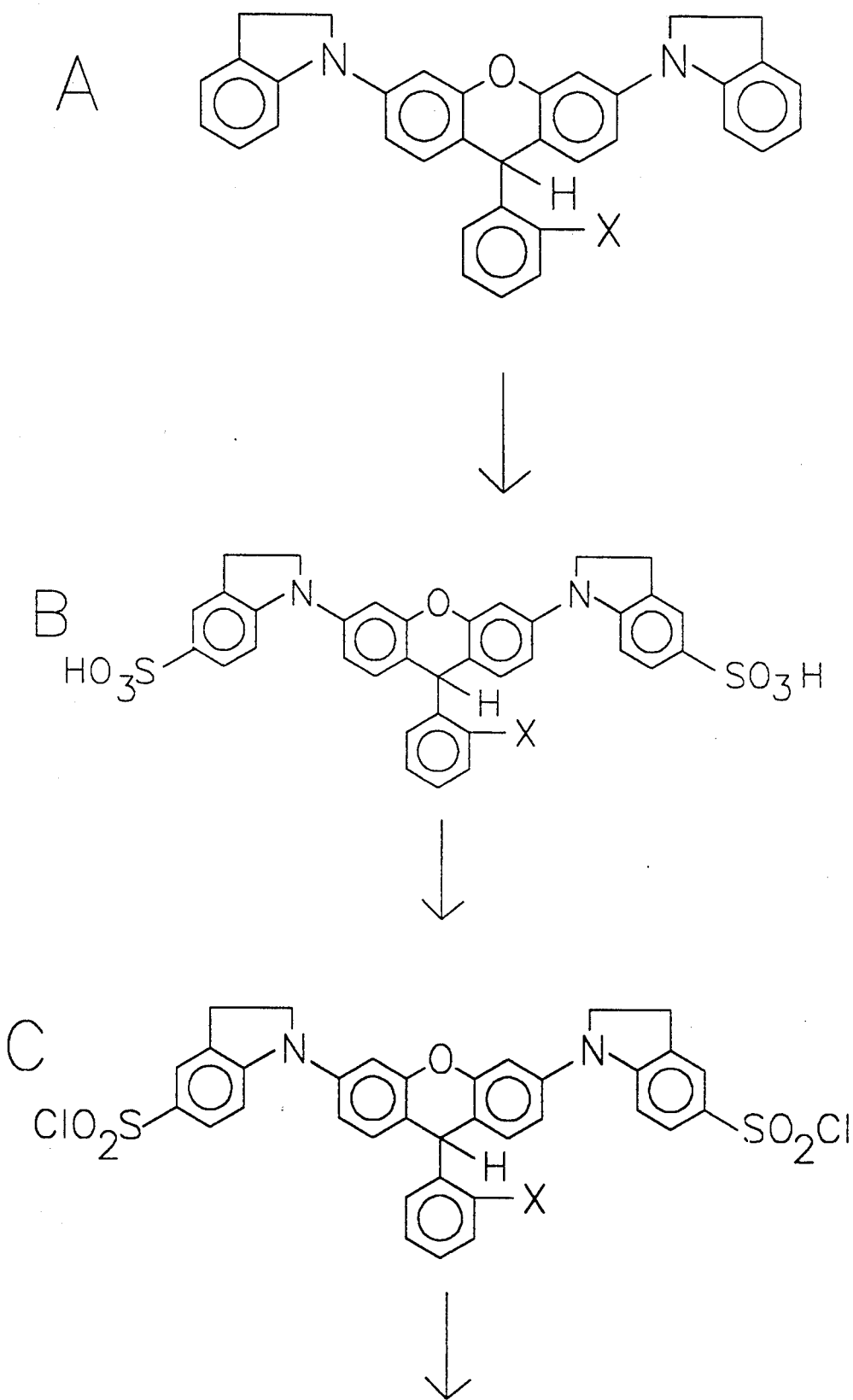
FIGS. 1A and 1B illustrate a process for the synthesis of the xanthene dye derivatives of Formula I above.

The xanthene dyes of Formula I may be divided into two main groups depending upon whether Z is a hydrogen atom or an $-SO_2-B(R^1)-R^2-NR^3R^4R^5$ grouping. Hereafter, the compounds in which Z is a hydrogen atom will be referred to as the "mono-quaternary" dyes of the invention, and the compounds in which Z is an $-SO_2-N(R^1)-R^2-NR^3R^4R^5$ grouping as the "di-quaternary" dyes of the invention. In general, the di-quaternary dyes are preferred, since they tend to be more soluble in aqueous media.

In the dyes of Formula I, X is desirably an $-SO_2-N(R^6)-COR^7$ grouping, preferably such a grouping in which $R^6$ and $R^7$ are each a methyl group. When X is an $-SO_2-N(R^6)-CO_2(CH_2)_2Y$ grouping, Y is an electron-withdrawing group, by which is meant a group having a positive sigma value as defined by Hammett's Equation. The electron-withdrawing group Y preferably has a positive sigma value ($\sigma^-$) greater than 0.6. Preferred electron-withdrawing groups include nitro; cyano; $-SO_2CH_3$; $-COCH_3$; $-SO_2Ph$; $-SO_2Ph-(p-CH_3)$ and $-SO_2N(CH_2Ph)_2$, where Ph represent a phenyl nucleus. The sigma values for these and other groups, such as $-CHO$, $-COOH$, $-COOC_2H_5$ and $-CONH_2$, have been reported by Eugen Muller, Methoden der Organischen Chemie, Georg Thieme Verlag, Stuttgart, 1970, page 78 in terms of $\sigma^-$ values based on the ionization of p-substituted phenols.

In the xanthene dyes of the present invention, $R^1$ is preferably a hydrogen atom, and the or each $R^2$ is desirably a polymethylene group containing from 2 to about 6 carbon atoms, preferably a trimethylene group. Preferably, the or each $R^3$, $R^4$ and $R^5$ is a methyl group. A specific group of preferred dyes are those in which X is an $-SO_2-N(CH_3)-COCH_3$ group; Z is an $-SO_2-N(R^1)-R^2-NR^3R^4R^5$ grouping, each $R^1$ is a hydrogen atom, each $R^2$ is a trimethylene group, and each $R^3$, $R^4$ and $R^5$ is a methyl group.

The anions of the xanthene dyes of the invention may be any anions which form a stable salt and which do not adversely affect the absorption properties of the dye, or interfere with other components of the medium in which it is present in a photographic product. To minimize aggregation in most photographic media in which the dyes are used, it is desirable that the cations be physically small. The synthesis described below produces the xanthene dye in the form of a halide salt, and it is convenient to use the dye in this form. However, if a salt with a different anion is preferred, anion exchange may be effected by any of the conventional ion exchange techniques, which are well known to those skilled in the dye art.

The xanthene dyes of this invention are colored, i.e., capable of absorbing visible radiation, but at an alkaline pH are converted to a colorless product by undergoing an irreversible cleavage reaction with base. The colorless product formed is a new compound, and the color change cannot be reversed by a change in pH. (Under very acidic conditions, at about pH 0-1, the "colorless product" is protonated and becomes colored. However, this color change under very acidic conditions is of no practical significance, since such acidic conditions never develop in the photographic media in which the xanthene dyes are normally employed.) It is believed that the mode of decolorization of the present dyes is the same as that of the dyes described in the aforementioned U.S. Pat. Nos. 4,258,118 and 4,290,950, i.e. the group X on the phenyl nucleus undergoes an irreversible cleavage reaction in alkaline solution to give the new colorless compound, namely, a cyclic sulfonamide:

out as described in the aforementioned U.S. Pat. Nos. 4,258,118 and 4,290,950, by treating the starting material A with chlorosulfonic acid in a relatively non-polar solvent, such as methylene chloride, to give mainly the monosulfonated product, or in a more polar solvent, such as acetic anhydride, to give essentially the disulfonated product.

Hereinafter, only the synthesis of the di-quaternary xanthene dye will be described in detail, since exactly the same reagents are used to produce the mono-quaternary xanthene dye and the intermediates produced will readily be apparent to persons skilled in the art of organic synthesis.

The disulfonated compound B is then treated with a halogenating agent, preferably phosphorus oxychloride, to produce the corresponding sulfonyl halide C (the chloride is shown, though the fluoro or bromo analogue could be used if desired). This sulfonyl halide C is a compound of Formula II in which W is an $-SO_2T$ group and each T is a chlorine atom.

Next, the sulfonyl chloride is condensed with two molar equivalents of a diamine having one tertiary amino group and one primary or secondary amino group to produce the corresponding N-(dialkylaminoalkyl)-sulfonamide (D in FIG. 1B). This sulfonamide D, which is a compound of Formula II in which W is an $-SO_2T$ group and each T is a $-N(R^1)-R^2-NR^3R^4$ grouping, is then quaternized, preferably with an alkyl halide such as methyl iodide, to produce the corresponding di-quaternary compound E, which is

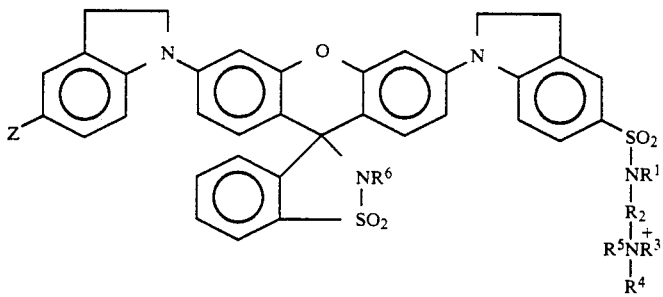

When X is an $-SO_2-N(R^6)-COCH_3$ grouping, an acetate ion is released as by-product, while when X is an $-SO_2-N(R^6)-CO_2(CH_2)_2Y$ grouping, the by-products are carbon dioxide and an olefin $CH_2=CHY$ or an alcohol $HOCH_2CH_2Y$. Both the cyclic sulfonamide and the by-products are colorless. Because this cleavage reaction proceeds at a faster rate at higher pH's, the present xanthene dyes are particularly suitable for use in photographic processes where the pH is maintained above about 10 at least for the time necessary for decolorization of the xanthene dye to the corresponding ring-closed sulfonamide.

The xanthene dyes of the present invention may be synthesized by the route shown in FIGS. 1A and 1B of the accompanying drawings. This synthetic route begins with the appropriate 2-[3,6-bis(5-indolino)xanthen-9-yl]benzenesulfonamide ((A) in FIG. 1A), the synthesis of which is described in the aforementioned U.S. Pat. Nos. 4,258,118 and 4,290,950. The sulfonamide A is converted to the corresponding 2-[3,6-bis(5-sulfoindolino)xanthen-9-yl]-benzenesulfonnmido (B), if n di-quaternary xantheno dye is desired, or to the corresponding 2-[3-(5-sulfoindolino)-6-indolinoxanthen-9-yl]-benzenesulfonamide if a mono-quaternary xanthene dye is desired. This sulfonation reaction may be carried a compound of Formula II in which W is an $-SO_2T$ group and each T is a $-N(R^1)-R^2-NR^3R^4R^5$ grouping (Alternatively, the sulfonyl halide C could be condensed with two molar equivalents of a mono-quaternized diamine to produce the diquaternary compound E directly, although synthesis of the mono-quaternized diamine may present synthetic difficulties.) Finally, this di-quaternary compound E is oxidized, for example with p-chloranil, to give the final dye F, a di-quaternary dye of Formula I.

As already mentioned, the xanthene dyes of the present invention are useful in photographic products and processes. In general a photographic product of the invention comprises a plurality of layers including a support and at least one photosensitive silver halide emulsion layer carried on the support, at least one of the plurality of layers comprising the colored xanthene dye. In one form of such a photographic product, the xanthene dye is disposed in a processing composition permeable layer on the same side of the support as the silver halide emulsion layer(s); preferably, such a support is transparent and the xanthene dye is disposed in a layer between the support and the silver halide emulsion layer(s). The photographic product may further comprise a layer of the xanthene derivative coated over the photosensitive silver halide emulsion layer outermost from the support on the surface opposite the support.

Another form of such a photographic product intended for use in forming a multicolor diffusion transfer image comprises:

a first sheet-like element comprising a first support carrying a red-sensitive silver halide emulsion layer, a green-sensitive silver halide emulsion layer, and a blue-sensitive silver halide emulsion layer, these silver halide emulsion layers having associated therewith, respectively, a cyan image dye-providing material, a magenta image dye-providing material and a yellow image dye-providing material;

a second sheet-like element comprising a second support, the first and second sheet-like elements being in superimposed relationship or adapted to be brought into superimposed relationship with the supports being outermost, and at least one of the supports being transparent to permit photoexposure of the silver halide emulsion layers therethrough;

a rupturable container releasably holding an aqueous alkaline processing composition, this container being so positioned as to be capable of discharging the processing composition between a pair of predetermined layers carried by the supports;

an image-receiving layer carried by one of the supports; and a processing composition permeable layer carried by one of the supports and comprising the xanthene derivative. When such a photographic product is developed:

a. the pH of the processing composition is maintained at an alkaline pH for a time sufficient to effect cleavage of the group X in the xanthene derivative, whereby the colored xanthene derivative is converted to the corresponding colorless ring-closed compound;

b. as a result of the development, an imagewise distribution of diffusible image-providing material is formed; and c. at least a portion of the imagewise distribution of diffusible image-providing material is transferred by diffusion to the image-providing material so as to provide a transfer image on the image-providing material.

Desirably, in such a photographic product, the xanthene derivative is so positioned that photoexposure of the silver halide emulsion layers is effected therethrough. Preferably, the second support is transparent and the image-receiving layer and the xanthene derivative are carried by the transparent second support.

As noted previously, the xanthene dyes of the present invention have the ability to decolorize completely and irreversibly in base by undergoing an irreversible cleavage reaction within a predetermined time at a predetermined pH to give a new colorless compound which remains colorless at the pH's normally encountered during processing subsequent to "bleaching", so that the new compound may be retained in a photographic product without the possibility of color reappearing in time. Typically, the xanthene dyes may be used as antihalation dyes, e.g., in a non-light-sensitive layer positioned intermediate a photosensitive silver halide emulsion layer and the support. Also, the xanthene dyes may be used as color correction filter dyes where absorption of light within a particular wavelength range during exposure is desirable for achieving appropriate color balance.

Illustrative film units in which the xanthene dyes of the present invention may be advantageously used as antihalation dyes are described, for example, in British Patent No. 1,482,156. These film units comprise, in the order in which incident light passes therethrough, an additive multicolor screen, a photosensitive silver halide emulsion layer, an antihalation layer in which the selected compound may be disposed, and preferably, an image-receiving layer. As described in the patent, exposure of the silver halide layer is accomplished through the screen which possesses optical filter elements selectively transmitting predetermined portions of incident radiation, e.g., red, green and blue light, to the underlying photosensitive silver halide layer. Upon photographic processing with an aqueous alkaline processing composition, soluble silver complex is transferred by diffusion and deposited in a superposed image-receiving layer as a function of the degree of exposure of silver halide behind each filter element. The silver image thus formed may then serve to modulate the quantity of light passing through the filter elements in the reverse direction during projection through a transparent support.

In a preferred embodiment, the image-receiving layer is intermediate the photosensitive silver halide emulsion layer and the additive multicolor screen and remains in position as part of an integral film unit prior to, during and after formation of the image. The antihalation dye is disposed in a processing composition permeable layer adjacent to the photosensitive layer on the side opposite the screen and serves to prevent the reflection or back-scattering of incident light which has passed through the photosensitive layer, thereby eliminating the exposure of silver halide grains in the photosensitive layer other than those within the intended photoexposure path.

As noted above, the dyes of the present invention are also useful as color correction filter dyes in photographic film units comprising multilayered, multicolor photosensitive elements employing a blue-, a green-, and a red-sensitive silver halide layer, and particularly in integral negative-positive diffusion transfer film units wherein the image-receiving layer carrying the color transfer image is not separated from the developed photosensitive layers after processing but both components are retained together as a permanent laminate. Included as part of the laminate is a layer of light-reflecting material, preferably titanium dioxide, positioned between the image-carrying layer and the developed photosensitive layer(s). The light-reflecting layer separating the image-carrying and photosensitive components provides a white background for the transfer image and masks the developed photosensitive layer(s). In addition to these layers, the laminate usually includes dimensionally stable outer layers or supports, at least one of which is transparent so that the resulting transfer image may be viewed by reflection against the background provided by the light-reflecting layer.

Illustrative of patents describing such film units are U.S. Pat. Nos. 2,983,606 issued Mar. 9, 1961 to Howard G. Rogers; 3,415,644; 3,415,645 and 3,415,646 issued Dec. 10, 1968 to Edwin H. Land; 3,594,164 and 3,594,165 issued Jul. 20, 1971 to Howard G. Rogers; 3,647,437 issued Mar. 7, 1972 to Edwin H. Land; and 4,740,448 issued Apr. 26, 1988 to Peter O. Kliem.

Whether used as antihalation dyes, color correction filter dyes or in other conventional photographic light-screening applications, the xanthene dyes of the present invention when disposed in a processing composition-permeable layer are completely and irreversibly decolorized by contact with an aqueous alkaline processing composition for the time necessary for converting the colored dye compound to the new colorless ring-closed compound. The time required for decolorization, i.e., for conversion of the colored compound to the colorless product via this irreversible cleavage reaction, may be measured at any given alkaline pH, and for a selected decolorization time, the pH of the processing composition contacted with and remaining in contact with the colored filter dye should be at least as high as that predetermined to give the selected decolorization time. The preferred compounds have a half-life ($T_{\frac{1}{2}}$) in approximately 1 N sodium hydroxide of about 30 seconds or less. By $T_{\frac{1}{2}}$ is meant the time measured for one-half of the colored dye to decolorize.

The xanthene dyes of the present invention may be incorporated into the appropriate layer of the photographic film unit using any of the techniques known in the art. For instance, the selected compound can be dissolved in the appropriate solvent and then dispersed, in the presence of a wetting agent if desired, in a coating solution containing a hydrophilic colloid binder, e.g., gelatin, and the resulting coating solution applied as the desired layer, for example, coated on a transparent support to provide an antihalation layer, or coated over the outermost photosensitive layer of a multilayered, multicolor photosensitive element to provide a color correction filter layer through which photoexposure is made. As previously noted, it is a significant advantage of the present xanthene dyes that they can readily be applied from aqueous media and, unlike certain prior art dyes, do not require coating from environmentally undesirable organic solvents. The concentration of xanthene dye in the relevant layer will vary depending upon the product in which the filter layer is to be used and may be readily determined empirically to provide the optical density necessary for the specific use. The dyes of the present invention may be used in combination with each other and also may be used in combination with other classes of dyes previously employed in antihalation, color correction and other filter layers.

In determining the appropriate light-absorbing capacity for cyan, magenta and yellow for color correction purposes, "color compensating" filters as conventionally used in front of the camera lens may be employed in the usual manner as a convenient method of approximating the type and quantity of filtration which it would be desirable to provide. A layer containing the appropriate color correction dye(s) in a corresponding density may then be provided as a layer through which photoexposure is to be made.

Multicolor diffusion transfer images may be obtained using a variety of arrangements of the image-receiving layer and the silver halide emulsions. Thus, these layers may be carried by a common support brought into superposition after photoexposure. A particularly advantageous film structure is shown in U.S. Pat. No. 3,415,644, wherein the requisite layers are in superposed relationship prior to and during photoexposure, and these layers are maintained in superposed relationship as a permanent laminate after processing and image formation. Such film units typically contain an outer transparent layer or support through which photoexposure is effected and the final multicolor image viewed, and another outer layer or support carrying at least the photosensitive layers, the latter support being opaque. While these supports or sheet-like elements may simply be held in superposed relationship, e.g., by a binding tape around the edges, or laminated together prior to photoexposure. Procedures for forming such prelaminated film units wherein the two elements are temporarily laminated together prior to exposure are described, for example, in U.S. Pat. No. 3,625,231 to Albert J. Bachelder and Frederick J. Binda, and U.S. Pat. No. 3,652,282 to Edwin H. Land, both issued Mar. 28, 1972 and in U.S. Pat. No. 3,793,023 issued to Edwin H. Land on Feb. 19, 1974.

Figure 2:
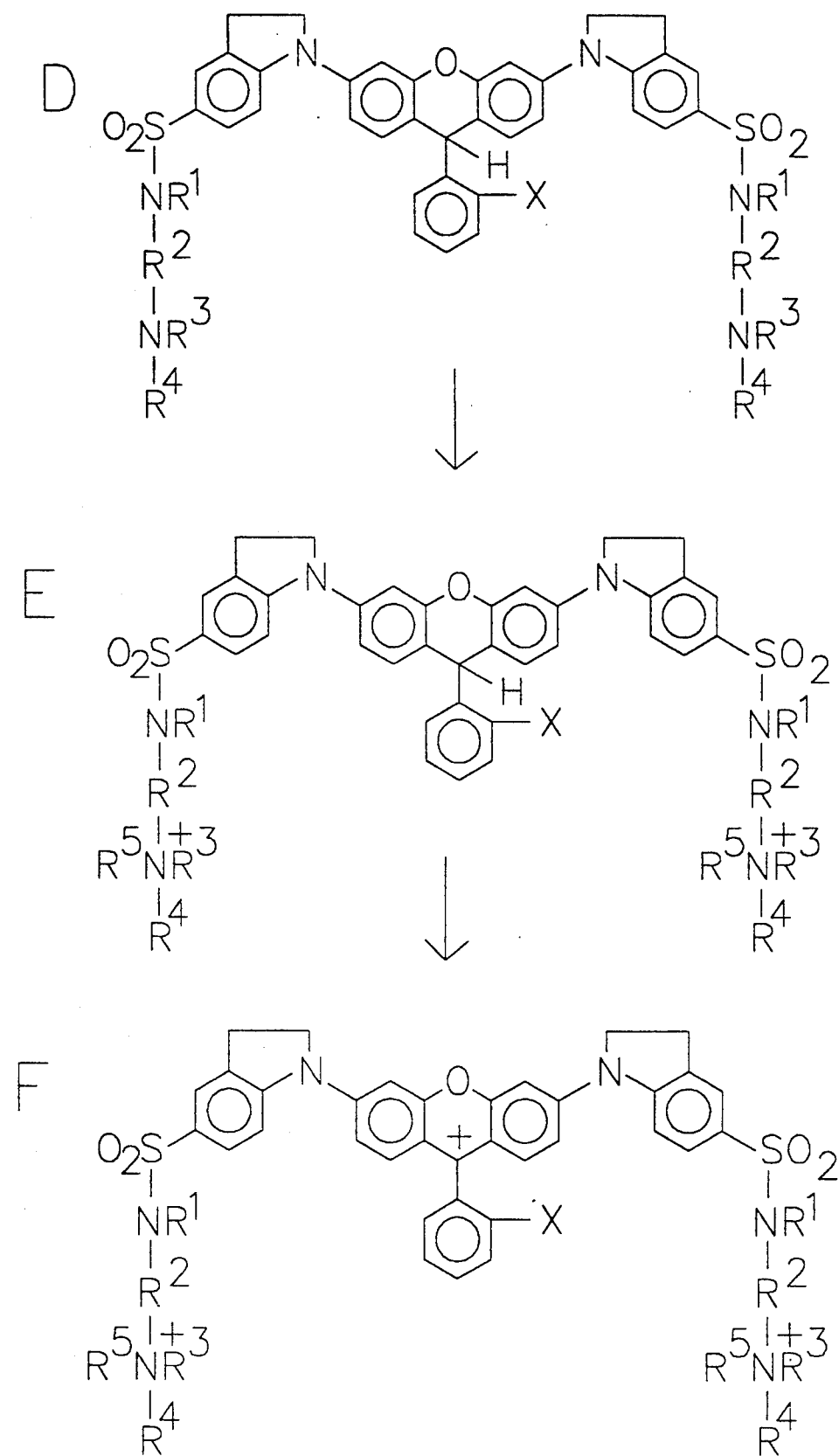
FIG. 2 is a schematic cross-section through a diffusion transfer film unit incorporating a xanthene derivative of the present invention as a color correction filter dye in the image-receiving layer.

FIG. 2 of the accompanying drawings illustrates a diffusion transfer film unit of the type disclosed in the aforementioned U.S. Pat. No. 4,740,448, which is adapted to provide integral negative-positive reflection prints and employing cyan and magenta dye developers as the image dyes to form the cyan and magenta colors, and a yellow image dye-releasing thiazolidine.

FIG. 2 illustrates a diffusion transfer film unit comprising a photosensitive component or element 1 shown in superposed relationship with a transparent image-receiving ("positive") component or element 5 through which photoexposure of the photosensitive element is to be effected. A rupturable container or pod 3 releasably holding a processing composition is positioned between the photosensitive and image-receiving elements 1 and 5. The photosensitive element 1 comprises an opaque support 10 carrying, in sequence, a neutralizing layer 12 of a polymeric acid, a layer 14 adapted to time the availability of the polymeric acid by preventing diffusion of the processing composition thereto for a predetermined time, a cyan dye developer layer 16, a spacer layer 18, a red-sensitive silver halide emulsion layer 20, a spacer layer 22, a magenta dye developer layer 24, a spacer layer 26, a green-sensitive silver halide emulsion layer 28, a spacer layer 30 containing a silver ion scavenger, a yellow filter dye layer 32, a layer 34 of a yellow image dye-releasing thiazolidine, a spacer layer 36 containing a colorless silver halide developing agent, a blue-sensitive silver halide emulsion layer 38, and a top coat or anti-abrasion layer 40. The image-receiving element or component 5 comprises a transparent support 50 carrying, in sequence, an image-receiving layer 52 and a clearing coat 54. Photoexposure is effected through the transparent support 50 and the layers carried thereon, which are also transparent, the film unit being so positioned in the camera that light admitted through the camera exposure or lens system is incident upon the outer or exposure surface of the transparent support 40. After exposure the film unit is advanced between suitable pressure applying members or rollers (not shown), rupturing the pod 3 thereby releasing and distributing a layer of an opaque processing composition containing titanium dioxide and pH-sensitive optical filter agents or dyes as taught in U.S. Pat. No. 3,647,347, thereby forming a laminate of the photosensitive element, and the image-receiving element 5 with their respective supports providing the outer layers of the laminate. The processing composition contains a film-forming, viscosity-providing polymer and has an initial pH at which the optical filter agents contained therein are colored; the optical filter agents are selected to exhibit the appropriate light absorption, i.e., optical density, over the wavelength range of ambient light actinic to the photosensitive element. As a result, ambient or environmental light within that wavelength range incident upon the surface of transparent support 50 and transmitted traversely through the transparent support and the transparent layers carried thereon in the direction of the exposed silver halide emulsions is absorbed, thereby avoiding further exposure of the photoexposed and developing silver halide emulsions. Exposed blue-sensitive silver halide is developed by a colorless silver halide developing agent initially present in spacer layer 36. Unexposed blue-sensitive silver halide is dissolved by a silver solvent initially present in the processing composition and transferred to the layer 34 containing a yellow image dye-releasing thiazolidine. Reaction with the complexed silver initiates a cleavage of the thiazolidine ring and release of a diffusible yellow image dye, as described, for example, in Cieciucn, et al. U.S. Pat. Nos. 3,719,489 and 4,098,783.

Development of the exposed green-sensitive and red-sensitive silver halide, preferably by a messenger developer, e.g. 4'-methylphenylhydroquinone, results in the imagewise immobilization of the magenta and cyan dye developers, respectively. Unoxidized magenta and cyan dye developers in unexposed areas of the green- and red-sensitive silver halide emulsions remain diffusible and transfer to the image-receiving layer 52 through the developed blue-sensitive silver halide emulsion layer 38. Transfer of the imagewise released yellow image dye and the imagewise unoxidized magenta and cyan dye developers to the image-receiving layer is effective to provide the desired multicolor transfer image.

Permeation of the alkaline processing composition through the timing layer 14 to the neutralizing (polymeric acid) layer 12 is so controlled that the process pH is maintained at a high enough level to effect the requisite development and image transfer and to retain the optical filter agents in colored form within the processing composition layer and on the silver halide emulsion side of the layer, after which pH reduction effected as a result of alkali permeation into the polymeric acid layer 12 is effective to reduce the pH to a level which changes the optical filter agents to a colorless form. Absorption of the water from the applied layer of the processing composition results in a solidified film composed of the film-forming polymer and the white pigment dispersed therein, thus providing a light-reflecting layer which also serves to laminate together the photosensitive component 1 and the image-receiving component 5 to provide the final integral image. The positive transfer image present in the image-receiving layer 54 is viewed through the transparent support 50 against the light-reflecting layer which provides an essentially white background for the dye image and also effectively masks from view the developed photosensitive element 1.

The xanthene derivatives of the present invention may be incorporated into either or both of the clearing coat 54 or the image-receiving layer 52, although preferably they are incorporated into the latter. In either layer, the xanthene derivatives act to filter the light passing through the image-receiving element 5 en route to the photosensitive element 1, thereby correcting for any mismatching of the D log E curves of the three photosensitive layers. When the strongly alkaline processing composition is released from the pod 3, the xanthene derivative is decolorized. Hence, the xanthene derivative does not affect the color of the final image, which as already noted is viewed by reflected light against the white background provided by the solidified processing composition.

Figure 3:
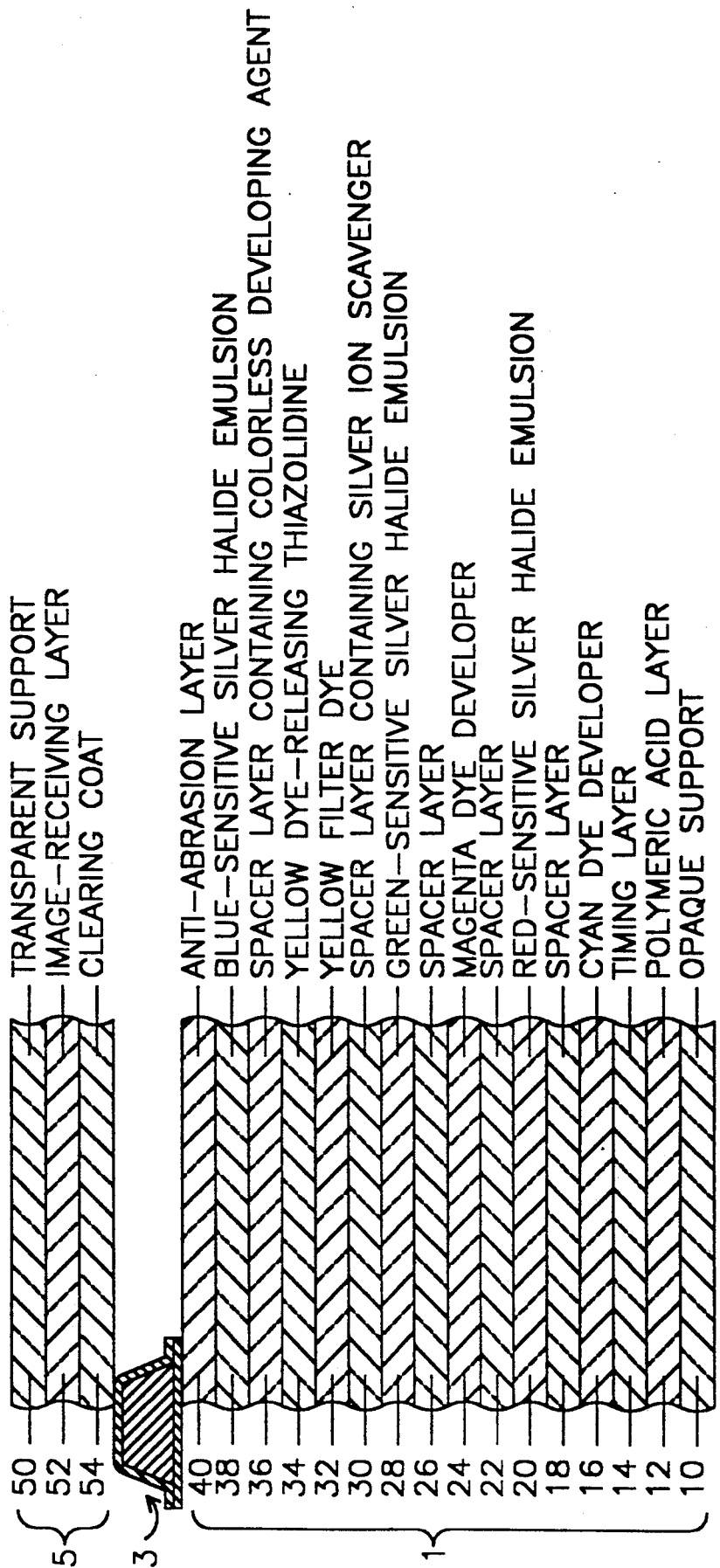

A number of modifications may be made in the structures shown in FIG. 2. Thus, for example, the multicolor multilayer negative may be replaced by a screen-type negative as illustrated in U.S. Pat. No. 2,968,554 issued Jan. 17, 1961 to Edwin H. Land and in the aforementioned U.S. Pat. No. 2,983,606, particularly with respect to FIG. 3 thereof, or the type of film units illustrated in the aforementioned U.S. Pat. Nos. 4,258,119 and 4,290,950 may be used. The present xanthene derivatives may also be employed in peel-apart film units such as those described in U.S. Pat. No. 4,794,067; when so employed, they may be disposed between the developing composition and the silver halide layers, so that they are discarded with the photosensitive element when this is peeled away from the image-receiving element after development.

U.S. Pat. Nos. 4,258,119 and 4,290,950, the disclosures of which are herein incorporated by reference describe in detail various preferred materials for use in the layers of such film units; accordingly, most of this information will not be repeated herein, and the reader is referred to these patents for further details.

The image dye-providing materials which may be employed in such processes generally may be characterized as either (1) initially soluble or diffusible in the processing composition but are selectively rendered nondiffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

Examples of initially soluble or diffusible materials and their use in color diffusion transfer are described in U.S. Pat. Nos. 2,774,668; 2,968,554; 2,983,606; 3,087,817; 3,185,567; 3,230,082; 3,345,163; and 3,443,943. Examples of initially non-diffusible materials and their use in color transfer systems are described in U.S. Pat. Nos. 3,185,567; 3,719,489; 3,443,939; 3,443,940; 3,227,550; 3,227,552; and 4,076,529. Many typos of image dye-providing substances and film units useful therewith also are discussed in tho aforementioned U.S. Pat. No. 3,647,437.

"Direct positive" silver halide emulsions may also be used, depending upon the particular image dye-providing substances employed and whether a positive or negative color transfer image is desired.

The dye developers (or other image dye-providing substances) are preferably selected for their ability to provide colors that are useful in carrying out subtractive color photography, that is, the previously mentioned cyan, magenta and yellow. They may be incorporated in the respective silver halide emulsion or, in the preferred embodiment, in a separate layer behind the respective silver halide emulsion. Thus, a dye developer may, for example, be in a coating or layer behind the respective silver halide emulsion and such a layer of dye developer may be applied by use of a coating solution containing the respective dye developer distributed, in a concentration calculated to give the desired coverage of dye developer per unit area, in a film-forming natural or synthetic polymer, for example, gelatin, polyvinyl alcohol, and the like, adapted to be permeated by the processing composition.

The image-receiving layer may comprise one of the materials known in the art, such as polyvinyl alcohol, gelatin, etc. It may contain agents adapted to mordant or otherwise fix the transferred image dye(s). Preferred materials comprise polyvinyl alcohol or gelatin containing a dye mordant such as poly-4-vinylpyridine, as disclosed in U.S. Pat. No. 3,148,061, graft copolymers containing 4-vinylpyridine as disclosed in U.S. Pat. No. 3,756,814, and copolymers containing polymerizable vinylbenzyl quaternary ammonium compounds disclosed in U.S. Pat. Nos. 4,322,489; 4,424,326 and 4,794,067.

In utilizing the xanthene dyes of the present invention to correct color balance, for example, in multicolor diffusion transfer photographic film units a photosensitive element may be exposed to a suitable multicolor step-wedge and diffusion transfer processed with a given processing composition and image-receiving element. The blue, green and red D log E curves of the resulting multicolor transfer image (sample image) are then prepared. Examination of these D log E curves will indicate to one skilled in color photographic sensitometry the manner and extent to which the individual D log E curves depart from the desired curve shape. From this examination, one may determine by routine analysis and experimentation how much filtration would be required of what wavelength range or ranges to obtain a more desirable color balance. The photosensitive element of another film unit, having the identical photosensitive element, image-receiving element and processing composition as used in obtaining the sample image, is then given the same exposure through a conventional color correction filter(s) of the color and density estimated to be necessary to provide the desired changes in the D log E curves of the sample image. The blue, green and red D log E curves of the resulting test multicolor transfer image are then prepared and compared with the sample. While more than one "test" may be required to determine the color filtration most effective to give the desired D log E curve shape changes, such tests may be performed rapidly and easily. When the appropriate color filtration has been determined, a layer containing a color correction dye or dyes absorbing light in appropriate wavelength range(s) is coated on a transparent support at a coverage calculated to provide the requisite density. This "test" color correction dye layer is placed in the exposure path and the previous exposure test repeated. Analysis of the D log E curves of the resulting multicolor transfer image will indicate what changes, if any, should be made in the spectral absorption range and density prior to incorporating a corresponding color correction dye layer into the diffusion transfer film unit.

Effecting photoexposure through a layer containing the subject dye(s) is effective to 37 filter", i.e., decrease the exposure given to the silver halide layer(s) exposable by light absorbed by the color correction dye(s), and one or more dyes of the present invention may be used in conjunction with other filter dyes for effecting changes in one, two or all three of the individual red, green and blue H and D curves to achieve the desired color balance. Though the present xanthene dyes find particular utility in diffusion transfer and other photographic film units where it is desired to bleach the dye(s) during processing subsequent to photoexposure through the dye layer(s), the dyes also may be employed in diffusion transfer and other film units where the dye is so positioned as not to contribute dye density to the transfer or final image. Where the filter dye layer through which photoexposure has been made is not part of the transfer image, or where the final image is masked from view as in certain integral negative-positive reflection print structures, the "unbleached" filter dye should be non-diffusible to the image-receiving layer containing the transfer image. The requisite nondiffusible character may be provided by the use of a suitable mordant, by the use of long chain "ballast" or "anchor" substituents and/or other techniques known in the art.

In integral diffusion transfer film units, the color correction dye(s) may be incorporated in the image-receiving layer. The choice of location of the color correction dye(s) will depend in large part upon the stage of the manufacturing process at which the color correction dye is incorporated. Provision of the color correction dye(s) in a separate layer has the advantage of permitting modification after the components have fully "matured" and also permits differing modification of portions of the same lot of the positive component.

The transfer image formed following exposure and processing of film units of the type illustrated in FIG. 2 is a geometrically reversed image of the subject. Accordingly, to provide geometrically non-reversed transfer images, exposure of such film units should be accomplished through an image reversing optical system, such as in a camera possessing an image reversing optical system utilizing mirror optics, e.g., as described in U.S. Pat. No. 3,447,437 issued Jun. 3, 1969 to Douglas B. Tiffany.

Where the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image", assume that the photosensitive element is exposed to actinic light through a negative transparency. In this case, the latent image in the photosensitive emulsion layers will be positive and the dye image produced on the image-carrying layer will be negative. The expression "positive image" is intended to cover such an image produced on the image-carrying layer, as well as transfer images obtained by use of direct positive silver halide emulsions to provide a "positive" image of the photographed subject.

While the usefulness of the present xanthene dyes has been illustrated as applied to integral diffusion transfer film units where the transfer image is retained with the developed photosensitive element as part of a permanent laminate, it will be understood that the xanthene dyes of this invention also may be used to provide antihalo, color correction or other light filtering layer(s) in diffusion transfer film units where the transfer image, either in silver or in dye, is separated from the developed photosensitive layer(s) subsequent to processing. Though the image dye-providing materials are preferably dye developers, other types of image dyes and dye intermediates may be employed to provide the dye transfer image.

Besides their usefulness in diffusion transfer photographic products and processes, the xanthene dyes of the present invention also may be used in filter layers of conventional photographic materials, for example, in antihalation or color correction layers in conventional negatives, and may be disposed in the appropriate layer(s) in an amount sufficient to provide the desired filtering effect. The selection and incorporation of the xanthene dye for the desired filtering effect may be accomplished in a known manner using conventional techniques and is well within the skill of the art. For example, for color correction purposes, the dye(s) selected may absorb light within a specific wavelength range, or within a combination of several wavelength ranges, and will be disposed in a layer through which photoexposure is made. Indeed, it may be desirable in a given instance to filter light of two different wavelength ranges in a ratio such that one silver halide emulsion receives more exposure filtration that does another. As in the diffusion transfer film units, the dye(s) selected for color correction are advantageously applied after the photosensitive element has aged to "maturity", i.e., the sensitometry of the photosensitive element as manufactured is no longer changing significantly with time. Where the subject dyes are employed for antihalation purposes, they may be incorporated, for example, in a layer on one or both sides of a support carrying the photosensitive layer(s) and where they are employed as optical filter agents, they will be so positioned as to prevent post-exposure fogging during processing in ambient light without, of course, interfering with imagewise exposure of the photosensitive layer(s) or with viewing of the final image.

The following Examples are now given, though by way of illustration only, to show details of particularly preferred reagents, materials, conditions and techniques used in forming and using the xanthene dyes, and photographic products and processes, of the present invention.

EXAMPLE 1

Preparation of Di-quaternary Dye

Example illustrates the preparation of the xanthene dye of Formula I in which X is an —$SO_2$—N(CH$_3$)—COCH$_3$ grouping, Z is an —$SO_2$—N($R^1$)—$R^2$—N$R^3R^4R^5$ grouping, each $R^1$ is a hydrogen atom, each $R^2$ is a trimethylene group, and each $R^3$, $R^4$ and $R^5$ is a methyl group.

Part A: Preparation of 2-[3,6-bis(indolino)xanthen-9-yl]benzene-N-methyl-N-acetylsulfonamide This Part illustrates the preparation of the compound A shown in FIG. 1A in which X is an N-methyl-N-acetylsulfonamide grouping. The preparation of the 2-[3,6-bis(indolino)xanthen-9-yl]- benzene-N-methylsulfonamide starting material used is described in U.S Pat. No. 4,258,118.

To a 500 mL three-necked flask equipped with an addition funnel, a septum, a nitrogen gas inlet and a magnetic stirring bar were added 2-[3,6-bis(indolino)xanthen-9-yl]benzene-N-methylsulfonamide (25.3 g, 43.2 mmole) and fresh tetrahydrofuran (THF) (250 mL), and the resultant mixture was purged with nitrogen. Potassium t-butoxide (1M in THF, 52 mL, 52 mmole) was transferred to the addition funnel via a cannula, and then added to the pale cyan slurry in the flask over a period of 10 minutes. The resultant solution was stirred for 15 minutes, and then a solution of acetyl chloride (4.6 mL, 5.1 g, 64.8 mmole) in THF (20 mL) was added. The reaction mixture finally gave a pale cyan slurry, which was stirred for 90 minutes. The solid product was collected on a Buchner funnel, washed with THF (50 mL) and hexanes (150 mL), and air-dried to yield 26.6 g (98%) of a pale cyan solid. The product was found to be pure by thin layer chromatography (using a 50/50/1 $CH_2Cl_2$/hexanes/MeOH mixture as eluent) and by proton nuclear magnetic resonance (NMR) analysis.

Part B: Preparation of 2-[3,6-bis(5-sulfoindolino)xanthen-9-yl]benzene-N-methyl-N-acetylsulfonamide This Part illustrates the preparation of the compound B shown in FIG. 1A in which X is an N-methyl-N-acetylsulfonamide grouping.

To a 500 mL round-bottomed flask equipped with an addition funnel and a magnetic stirring bar were added 2-[3,6-bis(indolino)xanthen-9-yl]-benzene-N-methyl-N-acetylsulfonamide ((21.7 g, 34.5 mmole, prepared in Part A above) and acetic anhydride (210 mL) A solution of chlorosulfonic acid (6.6 mL, 11.6 g, 100 mmole) in dichloromethane (10 mL) was added over a period of 15 minutes, giving a dark blue slurry. This slurry was stirred overnight and the solid product collected on a Buchner funnel, washed with acetic anhydride (25 mL) and ethyl acetate (3×25 mL aliquots), and air-dried to yield 26.4 g (97%) of a pale cyan powder. Thin layer chromatography (using a 50/1 chloroform/methanol mixture as eluent) indicated complete consumption of starting material, and the product was pure by proton NMR analysis.

Part C: Preparation of 2-3,6-bis(5-chlorosulfonylindolino)xanthen-9-yl]benzene-N-methyl-N-acetylsulfonamide This Part illustrates the preparation of the compound C shown in FIG. 1A in which X is an N-methyl-N-acetylsulfonamide grouping.

To a 500 mL three-necked flask equipped with an addition funnel, a nitrogen gas inlet and a thermometer were added 2-[3,6-bis(5-sulfoindolino)xanthen- 9-yl]benzene-N-methyl-N-acetylsulfonamide (13.1 g, 16.6 mmole, prepared in Part B above), acetonitrile (200 mL) and dimethylformamide (12.2 mL, 12.0 g, 166 mmole). The resultant solution was cooled to approximately 5° C., and then phosphoryl chloride (22 mL, 36.2 g, 236 mmole) was added dropwise, keeping the temperature below 12° C. (the addition took approximately 15 minutes). After an additional 15 minutes at 5° C., the reaction mixture was allowed to warm to room temperature, eventually giving an evergreen-colored solution. TLC analysis (using chloroform as eluent) after 2 hours indicated complete reaction. The reaction mixture was stored overnight in a refrigerator at 3° C., then the solid product was collected on a Buchner funnel, washed with other, and air-dried to yield 10.2 g (74%) of a pale green powder. The product was found to be pure by thin layer chromatography (using chloroform as eluent) and by proton NMR analysis.

Part D: Preparation of 2-[3,6-bis[5-N'-(3-(N",N"-dimethyl)aminopropyl)sulfonamidoindolino]xanthen-9-yl]-benzene-N-methyl-N-acetylsulfonamide dihydrochloride This Part illustrates the preparation of the dihydrochloride of the compound D shown in FIG. 1B in which X is an N-methyl-N-acetylsulfonamide grouping, each $R^1$ is a hydrogen atom, each $R^2$ is a trimethylene group, and each $R^3$ and $R^4$ is a methyl group.

To a 250 mL three-necked flask equipped with a dropping funnel, a magnetic stirring bar and a thermometer were added 2-[3,6-bis(5-chlorosulfonylindolino)x- anthen-9-yl]benzene-N-methyl-N-acetylsulfonamide (10.1 g, 12.2 mmole, prepared in Part C above) and dichloromethane (100 mL). The flask was placed in a room temperature water bath, and a solution of N,N-dimethyl-1,3-diaminopropane (2.57 g, 25.2 mmole) in dichloromethane (5 mL) was added over a period of 20 minutes, while the temperature of the reaction mixture was maintained below 30° C. Within 15 minutes the pale green reaction mixture turned pale cyan. After the reaction mixture had been stirred for 4 hours at room temperature, the solid product was collected by filtration on a Buchner funnel, and washed with 50 mL of a 2/1 dichloromethane/diethyl ether mixture, and air-dried to yield 11.75 g of a pale cyan powder. Addition of diethyl ether (50 mL) to the filtrate yielded another 0.3 g of precipitate, bringing the total pure by proton NMR analysis.

Part E: Preparation of
2-[3,6-bis[5-N'-(3-(N'',N'',N'''-trimethyl)ammonium-propyl)sulfonamidoindolino]xanthen-9-yl]benzene-N-methyl-N-acetylsulfonamide diiodide This Part illustrates the preparation of the diiodide salt of the dication E shown in FIG. 1B in which X is an N-methyl-N-acetylsulfonamide grouping, each $R^1$ is a hydrogen atom, each $R^2$ is a trimethylene group, and each $R^3$, $R^4$ and $R^5$ is a methyl group.

To a 100 mL round-bottomed flask equipped with a magnetic stirring bar were added 2-[3,6-bis[5-N'-(3-(N'',N''-dimethyl)aminopropyl)-sulfonamidoindolino]xanthen-9-yl]benzene-N-methyl-N-acetylsulfonamide dihydrochloride (6.08 g, 5.91 mmole, prepared in Part D above), dimethylformamide (60 mL), methyl iodide (3.7 mL, 8.4 g, 59.1 mmole), and magnesium oxide (0.48 g, 12.4 mmole). The resultant cloudy pale cyan suspension was stirred overnight. The excess magnesium salts were allowed to settle, and the pale cyan solution was decanted into a 250 mL Erlenmeyer flask. Tetrahydrofuran (160 ml) was added slowly to the solution with stirring, and a pale blue precipitate formed. After the reaction mixture had been stirred for 1 hour, the solid product was collected on a Buchner funnel, washed with diethyl ether (50 mL) and air-dried to yield 6.6 g (90%, assuming the diiodide salt) of a pale cyan powder. The product was found to be pure by proton NMR analysis, and elemental analysis gave results consistent with the formation of the diiodide salt.

Part F: Preparation of
2-[3,6-bis[5-N'-(3-(N'',N'',N'''-trimethyl)ammonium-propyl)sulfonamidoindolino]xanthen-9-yl-9-carbonium ion]benzene-N-methyl-N-acetylsulfonamide diiodide hemi-[tetrachlorohydroquinone dianion]

This Part illustrates the preparation of the diiodide hemi-[tetrachlorohydroquinone dianion] salt of the trication F shown in FIG. 1B in which X is an N-methyl-N-acetylsulfonamide grouping, each $R^1$ is a hydrogen atom, each $R^2$ is a trimethylene group, and each $R^3$ $R^4$ and $R^5$ is a methyl group.

To a 100 mL round-bottomed flask equipped with a reflux condenser and a magnetic stirring bar were added the diiodide salt prepared in Part E above (6.53 g, 5.27 mmole), p-chloranil (2.59 g, 10.5 mmole), methanol (40 mL) and methyl ethyl ketone (40 mL). The resultant mixture was refluxed for 90 minutes, and then allowed to stand at room temperature overnight. The gummy product was then triturated with tetrahydrofuran (190 mL), collected on a Buchner funnel, and air-dried to yield 6.0 g (84%) of an easily handled, dark reddish-cyan solid having $\lambda_{max}$ 645 nm, $\epsilon = 79,800$ (in a 1/1 v/V methanol/water mixture), based upon the molecular weight of 1362.03, corresponding to the formula $[Dye^{3+}][I^-]_2[-OC_6Cl_4O^-]0.5$. This dye will hereinafter be referred to as "Dye A".

EXAMPLE 2

Preparation and exposure of photographic product

This Example illustrates the ability of the dyes of the present invention to reduce the red speed of a film without increasing the minimum red optical density thereof, as compared with those described in the aforementioned U.S. Pat. Nos. 4,258,119 and 4,290,950.

The dyes used in these tests were Dye A prepared in Example 1 above and the prior art dyes, hereinafter referred to as Dyes B and C, of the formulae:

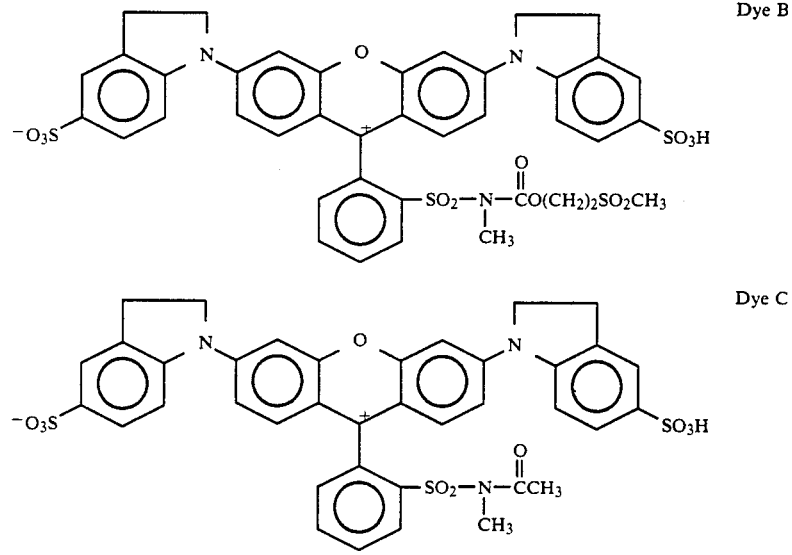

described in the aforementioned U.S. Pat. Nos. 4,258,119 and 4,290,950.

A mordant was prepared of the type described in the aforementioned U.S. Pat. No. 4,740,448. A terpolymer was prepared from 6.7 parts by weight of the trimethylammonium salt of chloromethylpolystyrene, 2.3 parts by weight of the triethylammonium salt of chloromethylpolystyrene and 1 part by weight of the dodecyldimethylammonium salt of chloromethylpolystyrene. Three parts by weight of this terpolymer were mixed with one part by weight of gelatin to form the mordant, which was then dissolved in water to form a 3% solution.

Dye A prepared in Example 1 was dissolved in water to form a 2.5% aqueous solution, and 16 mL of this solution was added to a mixture of 1000 g of the 3% aqueous solution of the mordant and 1.67 mL of a 25% aqueous solution of ammonium nitrate, and the resultant mixture was thoroughly stirred. A second solution was prepared in the same manner except that it was mixed with a sonifying probe rather than stirred. Similar solutions were prepared from Dyes B and C, except that these dyes had to be added as a 1% solution in a 1:1 water/trifluoroethanol mixture to avoid severe agglomeration upon contact with the mordant. Control solutions were also prepared without any dye. In all cases, the concentration of ammonium nitrate in the finished film was 3.2 mg/ft$^2$ (34.4 mg/m$^2$.).

The solutions were separately coated at a coverage of 230 mg/ft$^2$ (2.476 g/m$^2$) on to a 4 mil transparent polyethylene terephthalate film to give a coating weight of the dye of 3.0 mg/ft$^2$ (32.3 mg/m$^2$). The resultant coating was then overcoated with a 1:1.25 Igepal CO-997/poly-4-vinylpyrolidone layer at a coating weight of 60 mg/ft$^2$ (198 mg/m$^2$), and with a 1:1 Igepal/N80 Polyox layer at coating weight of 40 /ft$^2$ (132 mg/m$^2$), using a many-at-a-time coating process which deposited the two layers simultaneously. (Igepal CO-997 is a nonylphenoxypoly(ethyleneoxy)ethanol containing about 95% by weight ethylene oxide, having an HLB of about 19.0, sold by GAF Corporation; N80 Polyox is a non-ionic water-soluble poly(ethylene oxide) having an average molecular weight of about 200,000, sold by Union Carbide.) The resultant image-receiving element was affixed to a photosensitive element and a pod of processing composition as described in the aforementioned U.S. Pat. No. 4,740,448. The minimum optical density (RD$_{min}$) and speed of the film in red light (RSpeed, in log E units, at 0.75 optical density) were then determined, and the results are shown in Table 1 below, together with the difference ($\Delta_{RD}$) between the minimum optical densities of the films with dye and the control film, and the difference ($\Delta_{Rs}$) between the speeds of the films with dye and the control film (taken against Control 1 for Dye A and Control 2 for Dyes B and C in view of the order in which the coatings were made). For reasons explained below, the quotient $\Delta_{RD}/\Delta_{RS}$ is also given in Table 1.

TABLE 1

| Film | Sonified | RD$_{min}$ | ΔRD | RSpeed | Δ$_{RS}$ | Δ$_{RD}$/Δ$_{RS}$ |
|---|---|---|---|---|---|---|
| Control 1 | | 0.127 | — | 1.556 | — | — |
| Dye A | No | 0.130 | 0.003 | 1.494 | −0.062 | −0.05 |
| | Yes | 0.130 | 0.003 | 1.512 | −0.044 | −0.07 |
| Control 2 | | 0.133 | — | 1.553 | — | — |
| Dye B | No | 0.152 | 0.019 | 1.432 | −0.121 | −0.16 |
| | Yes | 0.143 | 0.010 | 1.416 | −0.137 | −0.07 |
| Dye C | No | 0.172 | 0.039 | 1.451 | −0.102 | −0.38 |
| | Yes | 0.165 | 0.032 | 1.443 | −0.110 | −0.29 |

Filter dyes ideally will effect significant filtration during exposure, and then bleach completely during processing, thus causing no increase in the final D$_{min}$ of the image. However, in practice some increase in D$_{min}$ is observed, presumably because of incomplete bleaching of the dye. Thus, filter dye performance can be judged by the ratio of the increase in D$_{min}$ to the speed correction observed, with a ratio close to zero being desirable.

From the data in Table 1, it will be seen that sonified mixing improves the performance of the prior art Dyes B and C, but not that of Dye A of the present invention. It is believed (although the invention is in no way limited by this belief) the lack of improvement of Dye A with sonification is a consequence of the ease of mixing of Dye A with the mordant, relative to that of Dyes B and C.

More importantly, it will be seen from the data in Table 1 that, in the absence of sonified mixing, Dye A of the present invention is more effective than either of the prior art Dyes B and C ($\Delta_{RD}/\Delta_{RS}$= −0.05 for Dye A versus −0.16 and −0.38 respectively for Dyes B and C). When sonified mixing is employed, Dyes A and B are approximately equivalent in performance, both being considerably better than Dye C. It should also be noted that these results were achieved with Dye A coated from a simple aqueous solution, without any use of environmentally undesirable organic co-solvents, whereas Dyes B and C had to be coated from aqueous trifluoroethanol.

EXAMPLE 3

Dye Stability Tests

This Example illustrates the improved storage stability of the xanthene derivatives of the present invention, as compared with those described in the aforementioned U.S. Pat. Nos 4,258,119 and 4,290,950.

The three dyes were incorporated Without sonified mixing into image-receiving elements in the same way as in Example 2, the amounts of dye added being chosen to provide 3.0 mg/ft$^2$ (32.3 mg/m$^2$) of each Dye in the image-receiving element. Ammonium nitrate was added to provide the stated amounts of the salt per square foot of the image-receiving element.

Samples of the resultant image-receiving elements were then stored at room temperature (approximately 70° F., 21° C.) and at 95° F. (35° C.) for two months. The stability of the dyes in the samples was then determined by measuring the absorption of the image-receiving element at approximately the $\lambda_{max}$ of the dye which each sample contained after 2 weeks, 1 month and two months storage. The results are shown in Table 2 below.

TABLE 2

| | | Optical Density against storage time | | | | | |
| | Storage Time | Room Temperature | | | 95° F. | | |
| Film | NH$_4$NO$_3$, mg/ft$^2$ | 2 weeks | 1 month | 2 months | 2 weeks | 1 month | 2 months |
|---|---|---|---|---|---|---|---|
| Dye A | 0 | −0.0 | −0.7 | −3.3 | −9.9 | −13.9 | −17.2 |

TABLE 2-continued

| | | Optical Density against storage time | | | | | |
| Storage Time | | Room Temperature | | | 95° F. | | |
| Film | NH$_4$NO$_3$, mg/ft$^2$ | 2 weeks | 1 month | 2 months | 2 weeks | 1 month | 2 months |
| --- | --- | --- | --- | --- | --- | --- | --- |
| Dye A | 6.4 | −2.9 | −1.0 | −3.8 | −4.8 | −7.7 | −10.6 |
| Dye B | 0 | −11.4 | −17.7 | −27.8 | −34.1 | −49.4 | −57.7 |
| Dye B | 3.2 | −3.3 | −8.5 | −7.5 | −13.6 | −21.1 | −24.4 |
| Dye B | 6.4 | +2.3 | −2.3 | −3.2 | −2.3 | −13.2 | −16.4 |
| Dye C | 3.2 | −1.2 | −1.9 | −2.5 | −4.9 | −8.0 | −7.4 |

From the data in Table 2, it will be seen that, in the absence of ammonium nitrate, Dye A of the present invention is substantially more stable than Dye B, typically displaying less than one-third of the loss of the prior art Dye B on storage. Even in the presence of ammonium nitrate, which is known to stabilize xanthene filter dyes such as Dyes B and C, Dye A is substantially more stable than Dye B. Furthermore, the use of ammonium nitrate as a stabilizer is known to have disadvantages, such as increased haze, in this type of film units. The stability of Dye C is comparable to that of Dye A; however, as shown in Example 2 above, Dye C produces a much larger increase in D$_{min}$ than Dye A, which increase in D$_{min}$ renders Dye C unsuitable for use in commercial instant film units.

From the data in Examples 2 and 3 above, it will be seen that the xanthene derivatives of the present invention provide dyes which are effective as color correction, filter and anti-halation dyes, which provide a combination of low D$_{min}$ and high stability Which is not achieved With prior art dyes. Moreover, the xanthene derivatives of the present invention can be incorporated into photographic products from simple aqueous solutions without any need to use undesirable solvents such as trifluoroethanol.

We claim:

1. A photographic product comprising a plurality of layers including a support and at least one photosensitive silver halide emulsion layer carried on the support, at least one of the plurality of layers comprising a colored xanthene derivative of the formula:

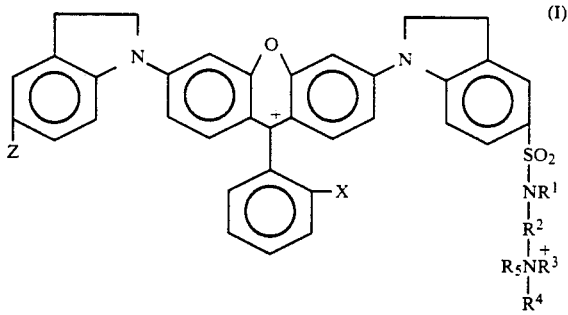

(I)

in which X is an —SO$_2$—N(R$^6$)—COR$^7$ or —SO$_2$—N(R$^6$)—CO$_2$(CH$_2$)$_2$Y grouping, wherein R$^6$ is an alkyl group containing not more than about 6 carbon atoms, R$^7$ is an alkyl or aryl group containing not more than about 10 carbon atoms and Y is an electron-withdrawing group; Z is a hydrogen atom or an —SO$_2$—N(R$^1$)—R$^2$—NR$^3$R$^4$R$^5$ grouping; R$^1$ is hydrogen or an alkyl group containing not more than about 6 carbon atoms; R$^2$ is an alkylene group containing from 2 to about 10 carbon atoms; R$^3$ and R$^4$ are each independently an alkyl group containing not more than about 6 carbon atoms, and R$^5$ is a hydrogen atom or an alkyl group containing not more than about 6 carbon atoms.

2. A photographic product according to claim 1, wherein the xanthene derivative is disposed in a processing composition permeable layer on the same side of the support as the silver halide emulsion layer(s).

3. A photographic product according to claim 2 wherein the support is transparent and the xanthene derivative is disposed in a layer between the support and the silver halide emulsion layer(s).

4. A photographic product according to claim 2 which further comprises a layer of the xanthene derivative coated over the photosensitive silver halide emulsion layer outermost from the support on the surface opposite the support.

5. A photographic product according to claim 1 wherein the xanthene derivative is one in which X is —SO$_2$—N(R$^6$)—COR$^7$ and Z is an —SO$_2$—N(R$^1$)—R$^2$—NR$^3$R$^4$R$^5$ grouping.

6. A photographic product according to claim 5 wherein the xanthene derivative is one in which X is an —SO$_2$—N(CH$_3$)—COCH$_3$ group, each R$^1$ is a hydrogen atom, each R$^2$ is a trimethylene group, and each R$^3$, R$^4$ and R$^5$ is a methyl group.

7. A photographic product according to claim 1 for forming a multicolor diffusion transfer image and comprising:

a first sheet-like element comprising a first support carrying a red-sensitive silver halide emulsion layer, a green-sensitive silver halide emulsion layer, and a blue-sensitive silver halide emulsion layer, these silver halide emulsion layers having associated therewith, respectively, a cyan image dye-providing material, a magenta image dye-providing material and a yellow image dye-providing material;

a second sheet-line element comprising a second support, the first and second sheet-like elements being in superimposed relationship or adapted to be brought into superimposed relationship with the supports being outermost, and at least one of the supports being transparent to permit photoexposure of the silver halide emulsion layers therethrough;

a rupturable container releasably holding an aqueous alkaline processing composition, this container being so positioned as to be capable of discharging the processing composition between a pair of predetermined layers carried by the supports;

an image-receiving layer carried by one of the supports; and a processing composition permeable layer carried by one of the supports and comprising the xanthene derivative.

8. A photographic product according to claim 7 wherein the xanthene derivative is so positioned that photoexposure of the silver halide emulsion layers is effected therethrough.

9. A photographic product according to claim 8 wherein the second support is transparent and the image-receiving layer and the xanthene derivative are carried by the transparent second support.

10. A photographic product according to claim 7 wherein the xanthene derivative is one in which X is —SO$_2$—N(R$^6$)—COR$^7$ and Z is an —SO$_2$—N(R$^1$)—R$^2$—NR$^3$R$^4$R$^5$ grouping.

11. A photographic product according to claim 10 wherein the xanthene derivative is one in which X is an —SO$_2$—N(CH$_3$)—COCH$_3$ group, each R$^1$ is a hydrogen atom, each R$^2$ is a trimethylene group, and each R$^3$, R$^4$ and R$^5$ is a methyl group.

12. A photographic process which comprises: exposing a photographic product comprising a plurality of layers including a support and at least one photosensitive silver halide emulsion layer carried on the support, at least one of the plurality of layers comprising a colored xanthene derivative of the formula:

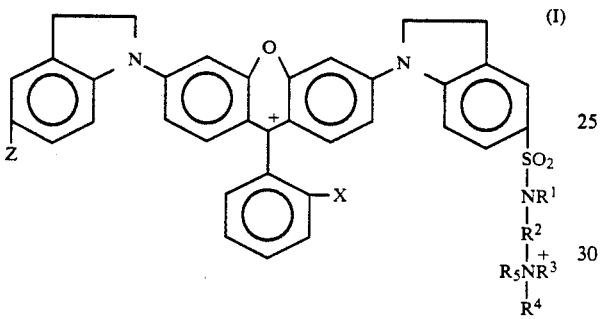

in which X is an —SO$_2$—N(R$^6$)—COR$^7$ or —SO$_2$—N(R$^6$)—CO$_2$(CH$_2$)$_2$Y grouping, wherein R$^6$ is an alkyl group containing not more than about 6 carbon atoms, R$^7$ is an alkyl or aryl group containing not more than about 10 carbon atoms and Y is an electron-withdrawing group; Z is a hydrogen atom or an —SO$_2$—N(R$^1$)—R$^2$—NR$^3$R$^4$R$^5$ grouping; R$^1$ is hydrogen or an alkyl group containing not more than about 6 carbon atoms; R$^2$ is an alkylene group containing from 2 to about 10 carbon atoms; R$^3$ and R$^4$ are each independently an alkyl group containing not more than about 6 carbon atoms, and R$^5$ is a hydrogen atom or an alkyl group containing not more than about 6 carbon atoms; and contacting the exposed photosensitive silver halide emulsion layer(s) with an aqueous processing composition having an alkaline pH, and thereby effecting development of the exposed photosensitive silver halide emulsion layer(s).

13. A photographic process according to claim 12 wherein the xanthene derivative is disposed in a processing composition permeable layer on the same side of the support of the silver halide emulsion layer(s), and the pH of the processing composition is maintained at an alkaline pH for a time sufficient to effect cleavage of the group X in the xanthene derivative, whereby the colored xanthene derivative is converted to the corresponding colorless ring-closed compound.

14. A photographic process according to claim 13 wherein the support is transparent and the xanthene derivative is disposed in a layer between the support and the silver halide emulsion layer(s).

15. A photographic process according to claim 13 wherein the photographic product further comprises a layer of the xanthene derivative coated over the photosensitive silver halide emulsion layer outermost from the support on the surface opposite the support.

16. A photographic process according to claim 12 wherein the xanthene derivative is one in which X is —SO$_2$—N(R$^6$)—COR$^7$ and Z is an —SO$_2$—N(R$^1$)—R$^2$—NR$^3$R$^4$R$^5$ grouping.

17. A photographic process according to claim 16 wherein the xanthene derivative is one in which X is an —SO$_2$—N(CH$_3$)—COCH$_3$ group, each R$^1$ is a hydrogen atom, each R$^2$ is a trimethylene group, and each R$^3$, R$^4$ and R$^5$ is a methyl group.

18. A photographic process according to claim 12 wherein at least one photosensitive silver halide emulsion layer has associated therewith an image-providing material, the photographic product further comprising an image-receiving layer adapted to receive solubilized image-providing material diffusing thereto, and the xanthene derivative is disposed on the same side of the support as the photosensitive silver halide emulsion layer(s) so that the xanthene derivative is contacted with the processing composition, and wherein
   a. the pH of the processing composition is maintained at an alkaline pH for a time sufficient to effect cleavage of the group X in the xanthene derivative, whereby the colored xanthene derivative is converted to the corresponding colorless ring-closed compound;
   b. as a result of the development, an imagewise distribution of diffusible image-providing material is formed; and
   c. at least a portion of the imagewise distribution of diffusible image-providing material is transferred by diffusion to the image-providing material so as to provide a transfer image on the image-providing material.

19. A photographic process according to claim 18 wherein the processing composition includes a silver halide solvent and the transfer image is an image in silver.

20. A photographic process according to claim 18 wherein the xanthene derivative is one in which X is —SO$_2$—N(R$^6$)—COR$^7$ and Z is an —SO$_2$—N(R$^1$)—R$^2$—NR$^3$R$^4$R$^5$ grouping.

21. A photographic process according to claim 20 wherein the xanthene derivative is one in which X is an —SO$_2$—(CH$_3$)—COCH$_3$ group, each R$^1$ is a hydrogen atom, each R$^2$ is a trimethylene group, and each R$^3$, R$^4$ and R$^5$ is a methyl group.

22. A photographic process according to claim 12 forming a multicolor diffusion transfer image and wherein the photographic product comprises:
   a first sheet-like element comprising a first support carrying a red-sensitive silver halide emulsion layer, a green-sensitive silver halide emulsion layer, and a blue-sensitive silver halide emulsion layer, these silver halide emulsion layers having associated therewith, respectively, a cyan image dye-providing material, a magenta image dye-providing material and a yellow image dye-providing material;
   a second sheet-line element comprising a second support,
   the first and second sheet-like elements being in superimposed relationship or adapted to be brought into superimposed relationship with the supports being outermost, and at least one of the supports being transparent to permit photoexposure of the silver halide emulsion layers therethrough;

a rupturable container releasably holding an aqueous alkaline processing composition, this container being so positioned as to be capable of discharging the processing composition between a pair of predetermined layers carried by the supports;

an image-receiving layer carried by one of the supports; and a processing composition permeable layer carried by one of the supports and comprising the xanthene derivative, and wherein:

a. the xanthene derivative is contacted with the processing composition;

b. the pH of the processing composition is maintained at an alkaline pH for a time sufficient to effect cleavage of the group X in the xanthene derivative, whereby the colored xanthene derivative is converted to the corresponding colorless ring-closed compound;

c. an a result of the development, an imagewise distribution of diffusible image-providing material is formed; and d. at least a portion of the imagewise distribution of diffusible image-providing material is transferred by diffusion to the image-providing material so as to provide a transfer image on the image-providing material.

23. A photographic process according to claim 22 wherein the xanthene derivative is so positioned that photoexposure of the silver halide emulsion layers is effected therethrough.

24. A photographic process according to claim 23 wherein the second support is transparent and the image-receiving layer and the xanthene derivative are carried by the transparent second support.

25. A photographic process according to claim 22 wherein the xanthene derivative is one in which X is $-SO_2-N(R^6)-COR^7$ and Z is an $-SO_2-N(R^1)-R^2-NR^3R^4R^5$ grouping.

26. A photographic process according to claim 25 wherein the xanthene derivative is one in which X is an $-SO_2-N(CH_3)-COCH_3$ group, each $R^1$ is a hydrogen atom, each $R^2$ is a trimethylene group, and each $R^3$, $R^4$ and $R^5$ is a methyl group.

* * * * *